(12) United States Patent
Frank

(10) Patent No.: US 9,528,358 B2
(45) Date of Patent: Dec. 27, 2016

(54) ENHANCED OIL RECOVERY SYSTEM AND A METHOD FOR OPERATING AN UNDERGROUND OIL RESERVOIR

(75) Inventor: Soren Frank, Doha (QA)

(73) Assignee: Maersk Olie og Gas A/S (DK)

( * ) Notice: Subject to any disclaimer, the term of this patent is extended or adjusted under 35 U.S.C. 154(b) by 311 days.

(21) Appl. No.: 14/116,898

(22) PCT Filed: May 10, 2012

(86) PCT No.: PCT/DK2012/050159
§ 371 (c)(1),
(2), (4) Date: Nov. 11, 2013

(87) PCT Pub. No.: WO2012/152286
PCT Pub. Date: Nov. 15, 2012

(65) Prior Publication Data
US 2014/0069642 A1 Mar. 13, 2014

(30) Foreign Application Priority Data
May 10, 2011 (DK) .................................. 2011 00361

(51) Int. Cl.
*E21B 43/16* (2006.01)
*C09K 8/582* (2006.01)
*E21B 43/20* (2006.01)

(52) U.S. Cl.
CPC ................ *E21B 43/16* (2013.01); *C09K 8/582* (2013.01); *E21B 43/20* (2013.01)

(58) Field of Classification Search
CPC .......... E21B 43/16; E21B 43/20; E21B 36/00; C09K 8/582
See application file for complete search history.

(56) References Cited

U.S. PATENT DOCUMENTS

| 4,501,674 A | 2/1985 | Wu |
| 5,421,412 A * | 6/1995 | Kelly ....................... C09K 8/62 166/300 |
| 2001/0045279 A1 | 11/2001 | Converse et al. |
| 2008/0115945 A1 | 5/2008 | Lau et al. |
| 2008/0142230 A1 | 6/2008 | Lau et al. |

(Continued)

OTHER PUBLICATIONS

International Search Report Application No. PCT/DK2012/050159 Completed: Apr. 18, 2013; Mailing Date: May 2, 2013 3 pages.

*Primary Examiner* — Michael Wills, III
(74) *Attorney, Agent, or Firm* — St. Onge Steward Johnston and Reens, LLC

(57) ABSTRACT

The present invention relates to an enhanced oil recovery system (1). The system (1) comprises an underground oil reservoir (2) comprising oil having an oil temperature (3) and an injection well (4) in fluid communication with the underground oil reservoir (2). The system (1) further comprises an enzyme storage (5) comprising temperature control means (6), wherein the temperature control means (6) are adapted for controlling the temperature of enzymes (7) in the enzyme storage (5) in relation to an operative temperature range (8) of the enzymes and/or the oil temperature (3) and the system (1) comprises injection means (9) for creating an injection stream comprising enzymes from the enzyme storage (5) to the underground oil reservoir (2) through the injection well (4). The invention further relates to a method for operating an underground oil reservoir (2).

22 Claims, 10 Drawing Sheets

(56) References Cited

U.S. PATENT DOCUMENTS

Figure 1:
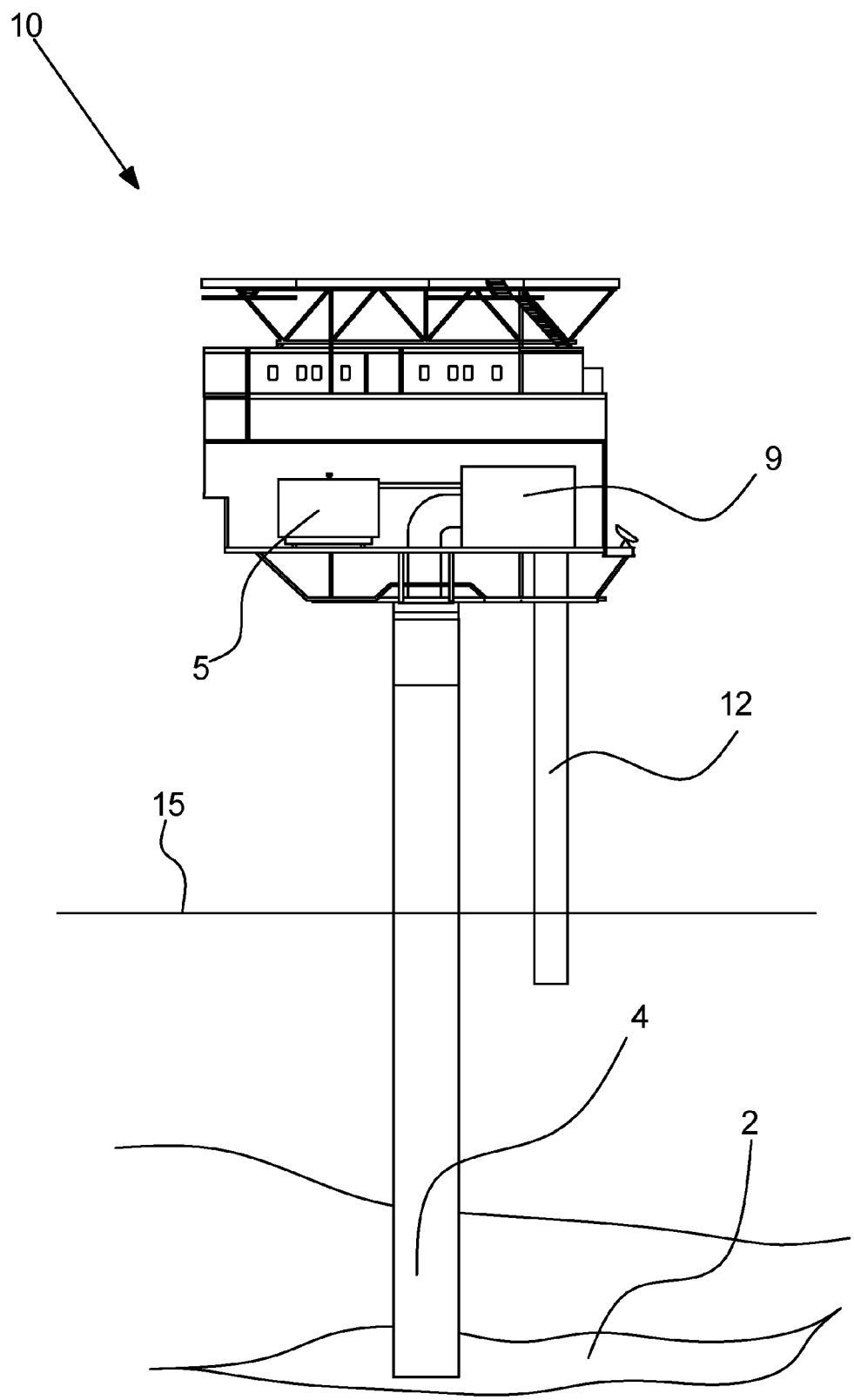

| | | | |
|---|---|---|---|
| 2009/0050325 A1 | 2/2009 | Gray et al. | |
| 2009/0062153 A1 | 3/2009 | Gray et al. | |
| 2009/0308613 A1* | 12/2009 | Smith | E21B 43/263 166/305.1 |
| 2011/0028357 A1* | 2/2011 | Abad | C09K 8/03 507/219 |
| 2011/0308801 A1* | 12/2011 | Dana | E21B 43/24 166/302 |

* cited by examiner

ENHANCED OIL RECOVERY SYSTEM AND A METHOD FOR OPERATING AN UNDERGROUND OIL RESERVOIR

FIELD OF THE INVENTION

The invention relates to an enhanced oil recovery system and a method for operating an underground oil reservoir according to the claims.

BACKGROUND OF THE INVENTION

In practical terms, enhanced oil recovery (EOR) systems relates to different techniques applied for the purpose of recovering as much oil from the underground as possible. A problem related to oil recovery in general is that a significant part of the oil remains in the underground when applying conventional recovery methods. Such methods may include water and gas flooding to keep the pressure high in the reservoir. In order to increase the amount of oil recovered from the underground, different techniques have been developed to increase the amount of oil recovered from already addressed reservoirs.

The conventionally applied techniques vary significantly in complexity, depending on many different factors including e.g. type of oil, the structure and the type of the underground formation, logistics, climate, amount of oil accessible from the well, etc.

The present invention relates to a specific type of oil recovery, namely the type of recovery in which the recovery is aided by the application of enzymes.

US patent application US 2008/0115945 A1 describes a method for recovery of hydrocarbons in a subterranean formation by a dedicated application of enzymatic fluid in that steam or heated fluid containing the enzymes is pumped into the underground oil reservoir to aid in the recovery of oil.

However, enzymes which are effective in relation to oil recovery are often not effective or operative at high temperatures and if they are, they are at least rare and expensive.

A problem related to the above mentioned prior art is therefore that such EOR system and method may become relatively expensive in different ways. A particular problem in relation to the above-mentioned techniques is that enzymes are relatively expensive and that the increased recovery obtained may be relatively low, when compared to the cost related to the applied enzymes, the applied EOR system and the applied recovery method.

THE INVENTION

The invention provides for an enhanced oil recovery system. The system comprises an underground oil reservoir comprising oil having an oil temperature and an injection well in fluid communication with the underground oil reservoir. The system further comprises an enzyme storage comprising temperature control means, wherein the temperature control means are adapted for controlling the temperature of enzymes in the enzyme storage in relation to an operative temperature range of the enzymes and/or the oil temperature and the system comprises injection means for creating an injection stream comprising enzymes from the enzyme storage to the underground oil reservoir through the injection well.

Some enzymes are particularly suited for recovering oil from an underground oil reservoir but these enzymes will often only have a certain temperature range at which they are operative. Outside this temperature range the enzymes will deteriorate or be destroyed. Even though the amount of enzymes needed for an effective EOR system—in relation with an underground oil reservoir—is high, it is still advantageous to store the enzymes in an enzyme storage comprising temperature control means because the temperature control means ensures that the enzymes are kept at a temperature at which the enzymes is not deteriorated and/or at a temperature which in relation to the oil temperature is particularly advantageous in relation to effective oil recovery. Thus, the available selection of enzymes being workable in relation to oil recovery becomes much greater and it therefore becomes possible to use more inexpensive enzymes, without substantially reducing the enzymes efficiency regarding oil recovery.

By the term "temperature control means" is to be understood any kind of cooling mechanism, heating mechanism or both or any other kind of temperature controller capable of controlling the temperature of enzymes in an enzyme storage.

By the term "injection means" is to be understood any kind of pressure increasing mechanism such as a pump, a plunger, a displacer or any other kind of injector capable of creating an injection stream from the injection well to the underground oil reservoir.

It should also be noted that by the term "operative temperature range of the enzymes" is to be understood the temperature range at which the enzymes are operative in the sense that they are not destroyed by too high or too low temperatures. Thus, the term "operative temperature range of the enzymes" does not refer to the temperature range at which the enzymes are workable i.e. the temperature range at which the enzymes are effective at recovering oil from the underground oil reservoir. The workable temperature range of enzymes—i.e. the temperature range at which the enzymes are able to perform their catalytic effect—is typically narrower than the operative temperature range of the enzymes—i.e. the temperature range at which the enzymes are "alive" in the sense that they are not deteriorated or in other ways destroyed by too high or too low temperatures.

In an aspect of the invention, said enzyme storage is arranged in close proximity of said injection well.

To reduce the risk of the enzymes exchanging heat with the surroundings before being injected into the underground oil reservoir it is advantageous to place the enzyme storage next to the injection well. Placing the enzyme storage close to the injection well will thus reduce the cost of controlling the temperature of the enzymes in the enzymes storage and reduce the cost of pipelines and lagging.

In an aspect of the invention, said temperature control means comprises active cooling means.

In general, if the enzyme storage temperature can get higher than the enzyme's operative temperature range it is advantageous to provide the temperature control means with active cooling means. This could e.g. be the case if the enhanced oil recovery system is to be used in very hot areas of the globe—such as the Middle East—where temperature can rise to over 50° C. during the daytime. In such cases the temperature in an enzyme storage could rise over the operative temperature range of the enzymes hereby starting the deterioration of the enzymes before they are put to use in a potentially hot underground oil reservoir.

By the term "active cooling means" is to be understood any kind of active cooling mechanism such as heat exchangers, refrigerators, thermoelectric cooling means or any other kind of active cooler capable of controlling the temperature of enzymes in an enzyme storage by active cooling.

In an aspect of the invention, said temperature control means comprises active heating means.

In general, if the enzyme storage temperature can get lower than the enzyme's operative temperature range it is advantageous to provide the temperature control means with active heating means. This could e.g. be the case if the enhanced oil recovery system is to be used in very cold areas of the globe—such as the Arctic—where temperature can drop below −50° C. In such cases the temperature in an enzyme storage could drop below the operative temperature range of the enzymes hereby starting the deterioration of the enzymes before they are put to use in a potentially hot underground oil reservoir.

By the term "active heating means" is to be understood any kind of active heating mechanism such as heat exchangers, electrical heater, gas heater, oil heater, solar heater, induction heater or any other kind of active heater capable of controlling the temperature of enzymes in an enzyme storage by active heating.

In an aspect of the invention, said temperature control means is integrated in or forming part of said enzyme storage.

Integrating the temperature control means in the enzyme storage is advantageous in that it provides for more efficient temperature control means in that the heating and/or cooling means are placed in or at least very close to the enzymes.

In an aspect of the invention, said temperature control means is arranged external to said enzyme storage.

Placing the temperature control means external to the enzyme storage is advantageous in that it enables more easy access to the temperature control means. Furthermore, if the enzyme storage was formed as mobile tanks in which the enzymes was transported to the drilling site it would be advantageous if temperature control means was arranged external to the enzyme storage tanks so that the temperature control means could stay more or less permanently at the drilling site and only the enzyme storage tanks was transported to and from the drilling site for refilling.

In an aspect of the invention, said enzyme storage comprises a plurality of tanks.

Providing the enzyme storage with a plurality of tanks is advantageous in that it enables enzyme storage redundancy and it enable that the risk of running out of enzymes is drastically reduced. Furthermore, the amount of enzymes used in and enhanced oil recovery system according to the present invention is massive and if all the enzymes were to be stored in a single tank this tank would be so big that it would be very difficult to manufacture and handle.

In an aspect of the invention, one or more of said plurality of tanks are mobile.

Making one or more of the tanks mobile is advantageous in that it hereby is possible to transport the enzymes to the injection well in the tank, which is a more inexpensive and efficient solution in relation to the temporary nature of the oil recovery system.

In an aspect of the invention, said enhanced oil recovery system comprises one or more temperature measuring means for obtaining said oil temperature.

Providing the enhanced oil recovery system with temperature measuring means for obtaining the oil temperature is advantageous in that it enable a more precise temperature measurement.

By the term "temperature measuring means" is to be understood any kind of thermometer, temperature gauge, infrared scanner or any other kind of temperature measure capable of capable of obtaining the temperature of the oil either analogue or digital or in another way.

In an aspect of the invention, at least one of said one or more temperature measuring means are arranged at a production well above the surface of the ground.

Placing the temperature measuring means at the production well is advantageous in that it enables that the oil temperature can be obtained from the oil being pumped from the underground oil reservoir, which enables that the temperature measuring means can be placed in a more controlled and less hostile environment.

In an aspect of the invention, at least one of said one or more temperature measuring means are arranged in or at said underground oil reservoir.

Placing the temperature measuring means in the underground oil reservoir is advantageous in that it enables more current and precise measurements of the oil temperature.

In an aspect of the invention, said enhanced oil recovery system comprises an oil temperature modelling unit capable of obtaining said oil temperature in said underground oil reservoir based on geological and/or geographical input.

Using a temperature modelling unit—such as a computer model or thermodynamically modelling—for calculating the oil temperature based on geological and/or geographical input is advantageous in that expensive on-site temperature measurements are avoided.

In an aspect of the invention, said enzymes are oil viscosity lowering enzymes.

Oil viscosity lowering enzymes will reduce the viscosity of the oil in the underground reservoir, making it flow more easily to the production well thereby increasing the amount of oil being recovered by the EOR system.

In an aspect of the invention, said enzymes are oil surface tension reducing enzymes.

Oil surface tension reducing enzymes will reduce the surface tension of the oil in the underground reservoir, making it flow more easily to the production well thereby increasing the amount of oil being recovered by the EOR system.

In an aspect of the invention, said enzymes are carbon-carbon bond scissoring enzymes.

Carbon-carbon bond scissoring enzymes will break the carbon bonds in the oil in the underground reservoir, making it flow more easily to the production well thereby increasing the amount of oil being recovered by the EOR system.

In an aspect of the invention, said enzymes are oil-wet altering enzymes.

Oil-wet altering enzymes are advantageous to use in relation with an EOR system because they influence on the oils ability to adhere to the rock surfaces in the underground oil reservoir by altering the preference of the rock surface towards being water-wet so that the oil is released. In other words the term "oil-wet altering enzymes" covers any kind of enzymes capable of making the rock surfaces having higher affinity for water or making the rock surface more hydrophilic.

In an aspect of the invention, said enzymes are emulsifying enzymes.

In an aspect of the invention, said temperature control means are adapted for maintaining the temperature of said enzymes in said enzyme storage within a desired temperature range.

Enzymes suitable for use in EOR systems will usually deteriorate it they are too cold or too hot. Thus, instead of merely maintaining the temperature of the enzymes above a predefined temperature level at all times or below a predefined temperature level at all times it is advantageous to make the temperature control means maintain the temperature of the enzymes within a desired temperature range such as a predefined temperature range.

In an aspect of the invention, said desired temperature range is within 40%, preferably 30% and most preferred 20% of said operative temperature range of said enzymes from each of the upper and the lower limit of said operative temperature range.

If the desired temperature range is too narrow in relation to the operative temperature range of the enzymes the temperature controlling capacity of the temperature control means will have to be increased making the temperature control means expensive and more energy consuming. If the desired temperature range is too wide in relation to the operative temperature range of the enzymes the risk of the temperature of the enzymes rising or dropping to a temperature outside the operative temperature range of the enzymes is increased whereby the risk of the enzymes being damaged is increased.

Thus, the present temperature range presents an advantageous relationship between cost and the risk of damaging the enzymes.

In an aspect of the invention, said desired temperature range is 80% above to 80% below, preferably 50% above to 50% below and most preferred 30% above to 30% below said oil temperature.

If the desired temperature range is too narrow in relation to the oil temperature the temperature controlling capacity of the temperature control means will have to be increased making the temperature control means expensive and more energy consuming. If the desired temperature range is too wide in relation to the oil temperature the risk of the temperature of the enzymes rising or dropping to a temperature outside the operative temperature range of the enzymes is increased whereby the risk of the enzymes being damaged is increased.

Thus, the present temperature range presents an advantageous relationship between cost and risk of damaging the enzymes.

In an aspect of the invention, said temperature control means is adapted for maintaining the temperature of said enzymes below 120° C., preferably below 95° C. and most preferred below 75° C.

If the upper temperature level of the temperature control means becomes too high the number of available enzymes, which can be used in an EOR system, is severely reduced and it is therefore advantageous to make the temperature control means maintain the temperature of the enzymes below the present levels.

In an aspect of the invention, said temperature control means is adapted for maintaining the temperature of said enzymes above −30° C., preferably above −10° C. and most preferred above 0° C.

If the lower temperature level of the temperature control means becomes too low the number or available enzymes, which can be used in an EOR system, is severely reduced and it is therefore advantageous to make the temperature control means maintain the temperature of the enzymes above the present levels.

In an aspect of the invention, enzymes are dissolved or suspended in a liquid in said enzyme storage.

Storing the enzymes dissolved or suspended in a liquid is advantageous in that it makes it easy and simple to create the injection stream to the underground oil reservoir through the injection well and it ensure a more uniform distribution of the enzymes.

In an aspect of the invention, said liquid is water.

Water is usually relatively inexpensive and easily accessible in the amount needed for an EOR system according to the present invention and it is therefore advantageous to dissolve or suspend the enzymes in water.

In an aspect of the invention, at least parts of said enzyme storage are submerged in water.

Submerging e.g. one or more tanks of the enzyme storage in water—such as in the sea around an offshore oil rig—is advantageous in that temperature of the water usually do not fluctuate as much as the air temperature thereby making it easier and less energy consuming to control the temperature of the enzymes in the enzyme storage. Submerging the entire tank is advantageous in that it makes the tank less sensitive to fluctuations of the air temperature and it reduces the risk of the tank being hit by ships or other floating objects.

In an aspect of the invention, at least parts of said enzyme storage are floating in water.

Floating e.g. one or more tanks of the enzyme storage in water—such as in the sea around an offshore oil rig—is advantageous in that temperature of the water usually do not fluctuate as much as the air temperature thereby making it easier and less energy consuming to control the temperature of the enzymes in the enzyme storage. Making the tank float in the surface of the sea makes it easier to place and replace the tank.

The invention further provides for a method for operating an underground oil reservoir. The method comprises the steps of:

providing the underground oil reservoir with an injection well, obtaining an oil temperature of oil in the underground oil reservoir, controlling the temperature of enzymes in an enzyme storage, and establishing an injection stream into the underground oil reservoir through the injection well, wherein the injection stream comprises enzymes from the enzyme storage.

Controlling the temperature of the enzymes in the enzyme storage before it is injected into the underground oil reservoir is advantageous in that it ensures that the enzymes are stored at a temperature at which they are not damaged i.e. they are stored within their operative temperature range. And by obtaining the oil temperature of the oil in the underground it is possible to control the temperature of the stored enzymes also in relation to this temperature to ensure that the enzymes are as effective as possible at recovering oil in the underground oil reservoir when injected into the underground oil reservoir through the injection well.

In an aspect of the invention, said temperature of said enzymes is controlled by maintaining the temperature of said enzymes within a desired temperature range.

Enzymes are usually damaged if they become too cold or too hot and it is therefore advantageous to maintain the temperature of the enzymes in the enzyme storage within a desired temperature range.

In an aspect of the invention, said desired temperature range is predefined in relation to an operative temperature range of said enzymes.

By controlling the temperature of the enzymes in the enzyme storage so that it is maintained within the operative temperature range of the enzymes it is possible to ensure that the temperature of the enzymes never exceeds neither the upper nor the lower limit of the enzymes operative temperature range so that the risk of the enzymes deteriorating or in other ways being damaged in the storage, in the injection well or in the underground oil reservoir is severely reduced.

In an aspect of the invention, said desired temperature range is within 40%, preferably 30% and most preferred 20% of said operative temperature range of said enzymes from each of the upper and the lower limit of said operative temperature range.

In an aspect of the invention, said desired temperature range is provided in relation to said oil temperature.

Controlling the temperature of the enzymes in the enzyme storage in relation to the oil temperature of the oil in the underground oil reservoir is advantageous because it enables that the enzymes are better adapted temperature-wise to the specific oil recovery task and it reduces the risk of the enzymes deteriorating or in other ways being damaged in the storage, in the injection well or in the underground oil reservoir.

In an aspect of the invention, said desired temperature range is 80% above to 80% below, preferably 50% above to 50% below and most preferred 30% above to 30% below said oil temperature.

In an aspect of the invention, said temperature of said enzymes is controlled actively.

Controlling the temperature of the enzymes actively is advantageous in that it enables that the enzymes can be stored at a specific temperature and that this temperature can be actively controlled in relation to a number of external or internal factors such as ambient temperature, geological conditions, shadow conditions, enzyme age, enzyme deterioration level or equipment conditions.

In an aspect of the invention, said temperature of said enzymes in said enzyme storage is controlled to be below 120° C., preferably below 95° C. and most preferred below 75° C.

In an aspect of the invention, said temperature of said enzymes in said enzyme storage is controlled to be above −30° C., preferably above −10° C. and most preferred above 0° C.

In an aspect of the invention, said oil temperature is obtained by measuring the temperature of the oil in or at said underground oil reservoir.

In an aspect of the invention, said oil temperature is obtained by measuring the temperature of oil arriving at ground surface.

In an aspect of the invention, said oil temperature is obtained by means of a computer model based on inputs regarding geological and/or geographical conditions of said underground oil reservoir.

FIGURES

Figure 2:
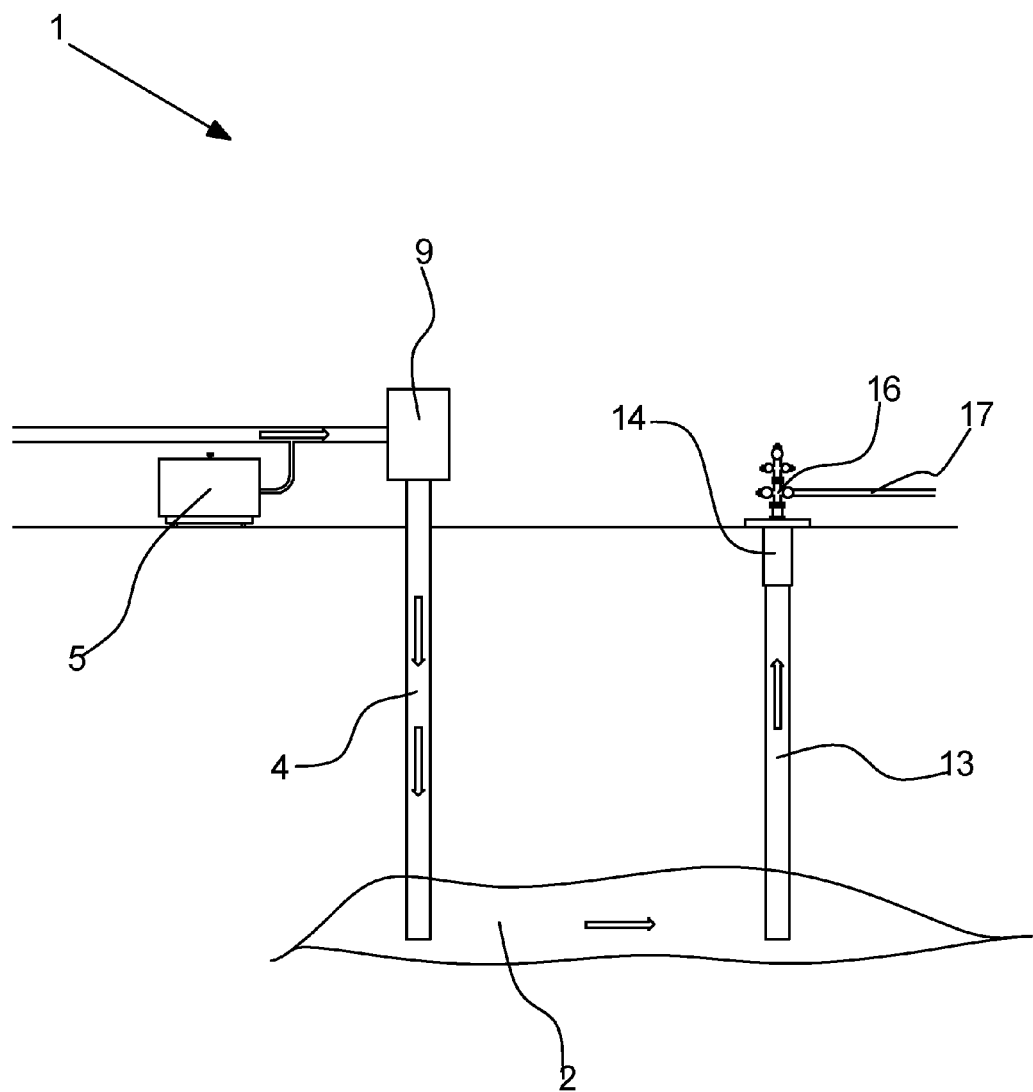
Figure 3:
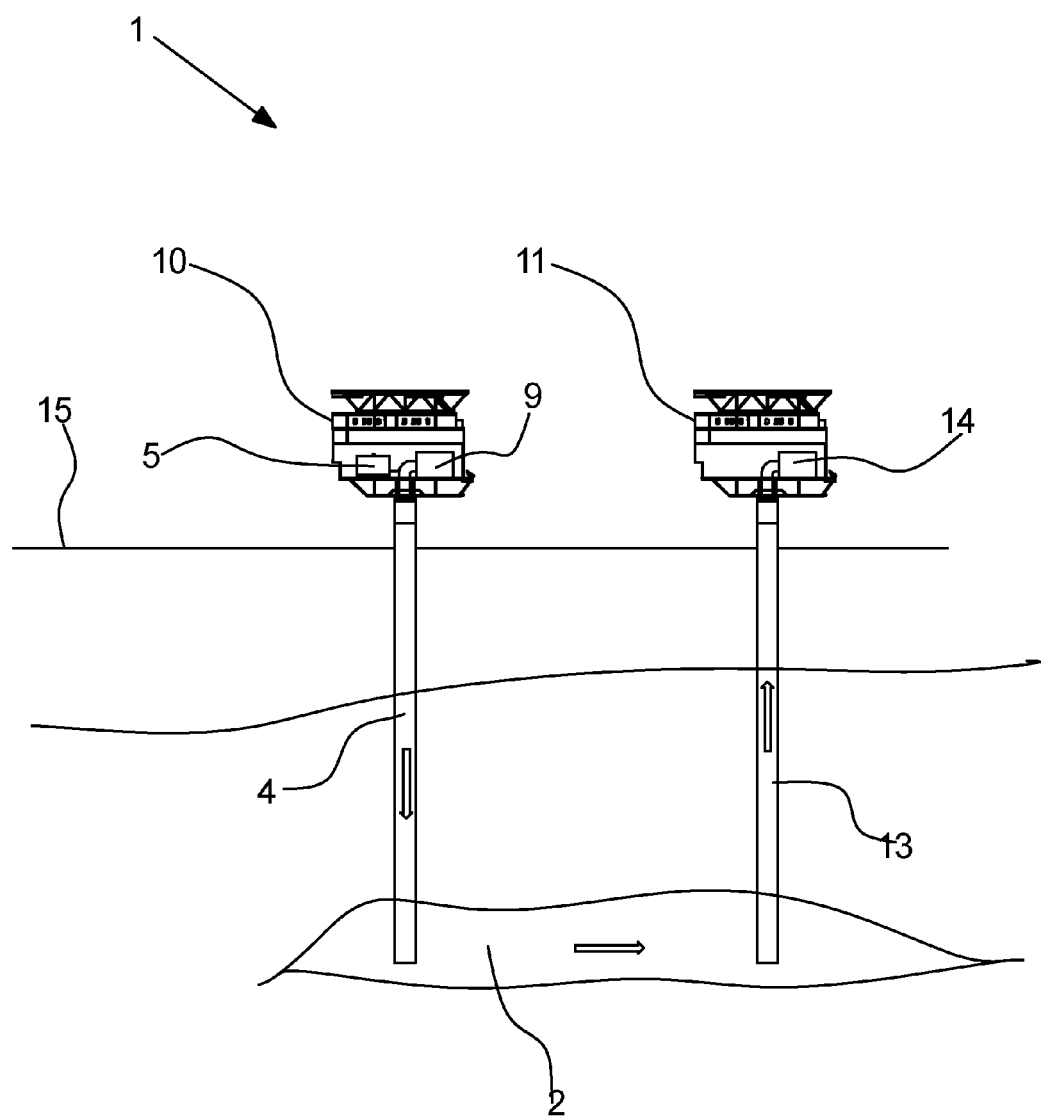
Figure 4:
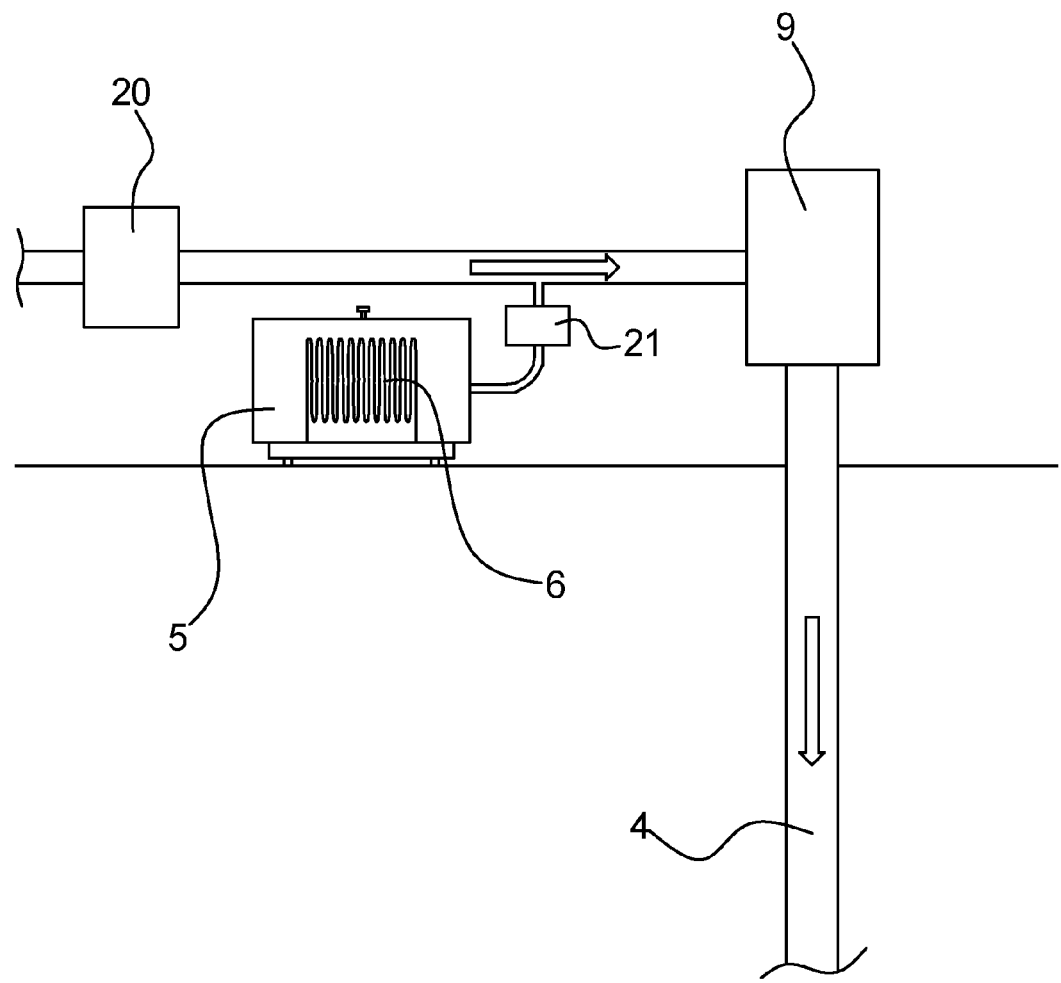
Figure 5:
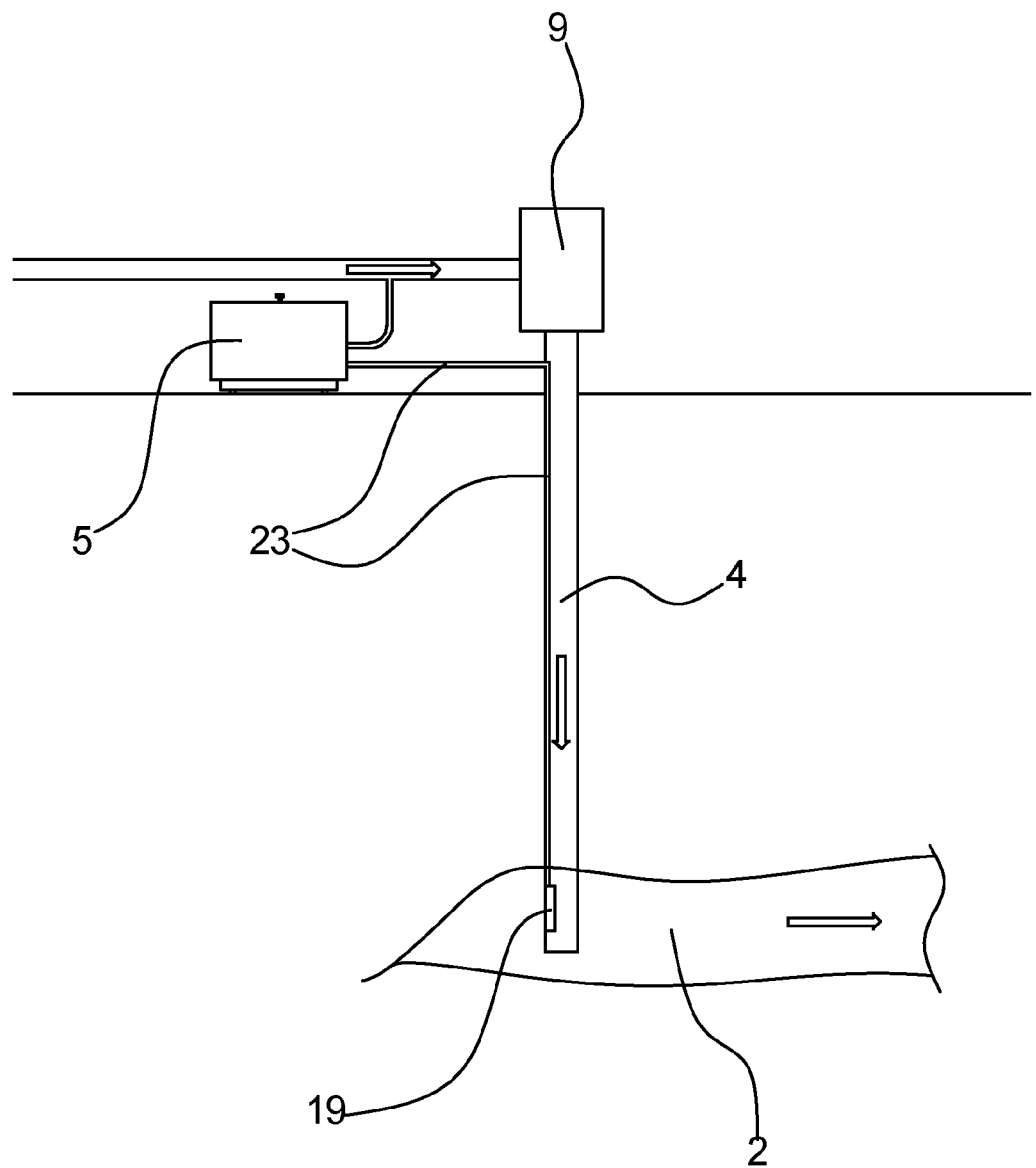
Figure 6:
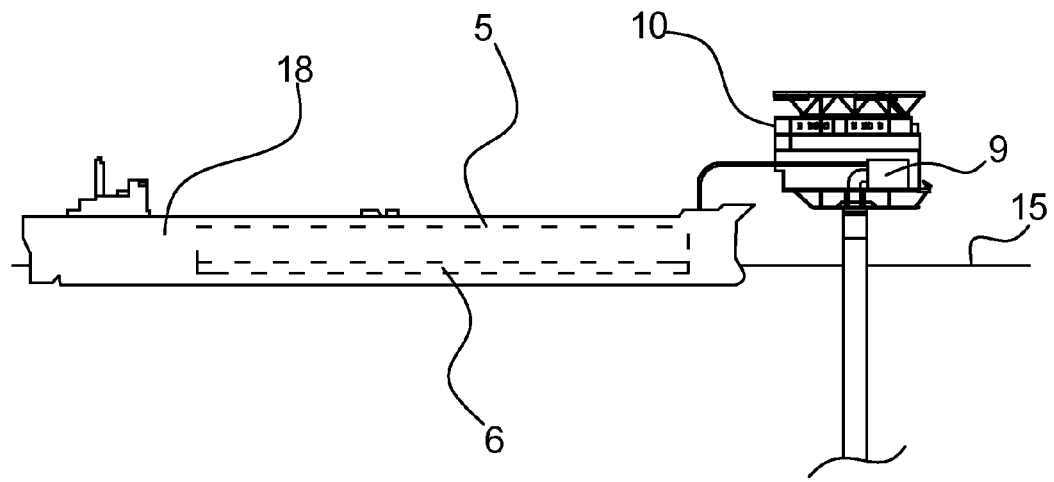
Figure 7:
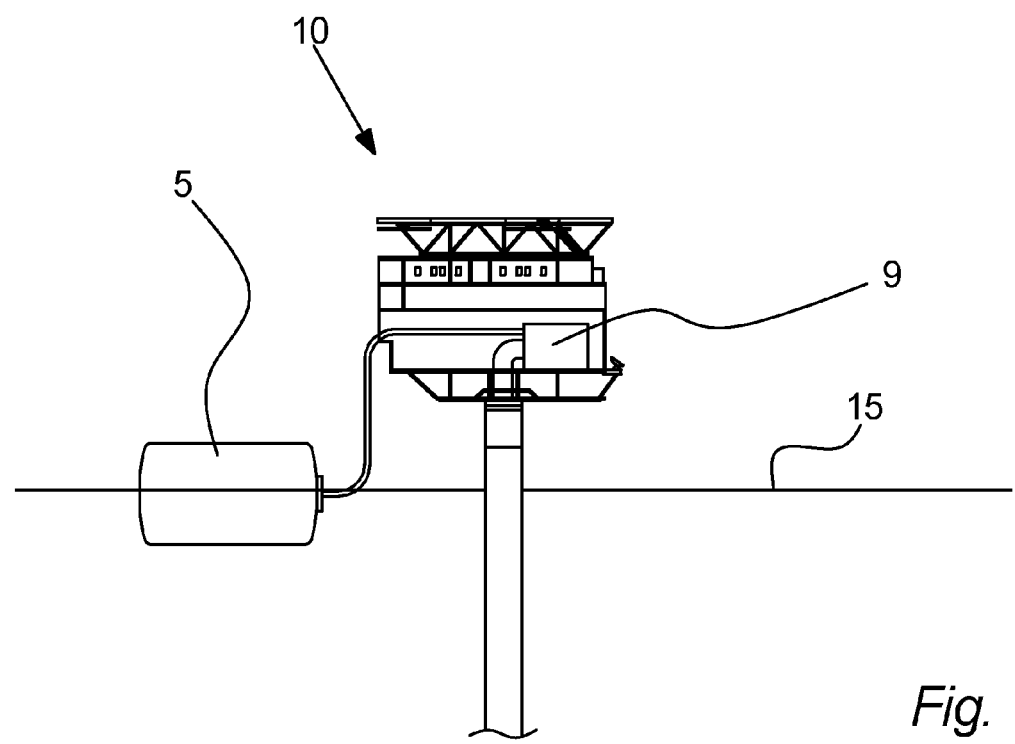
Figure 8:
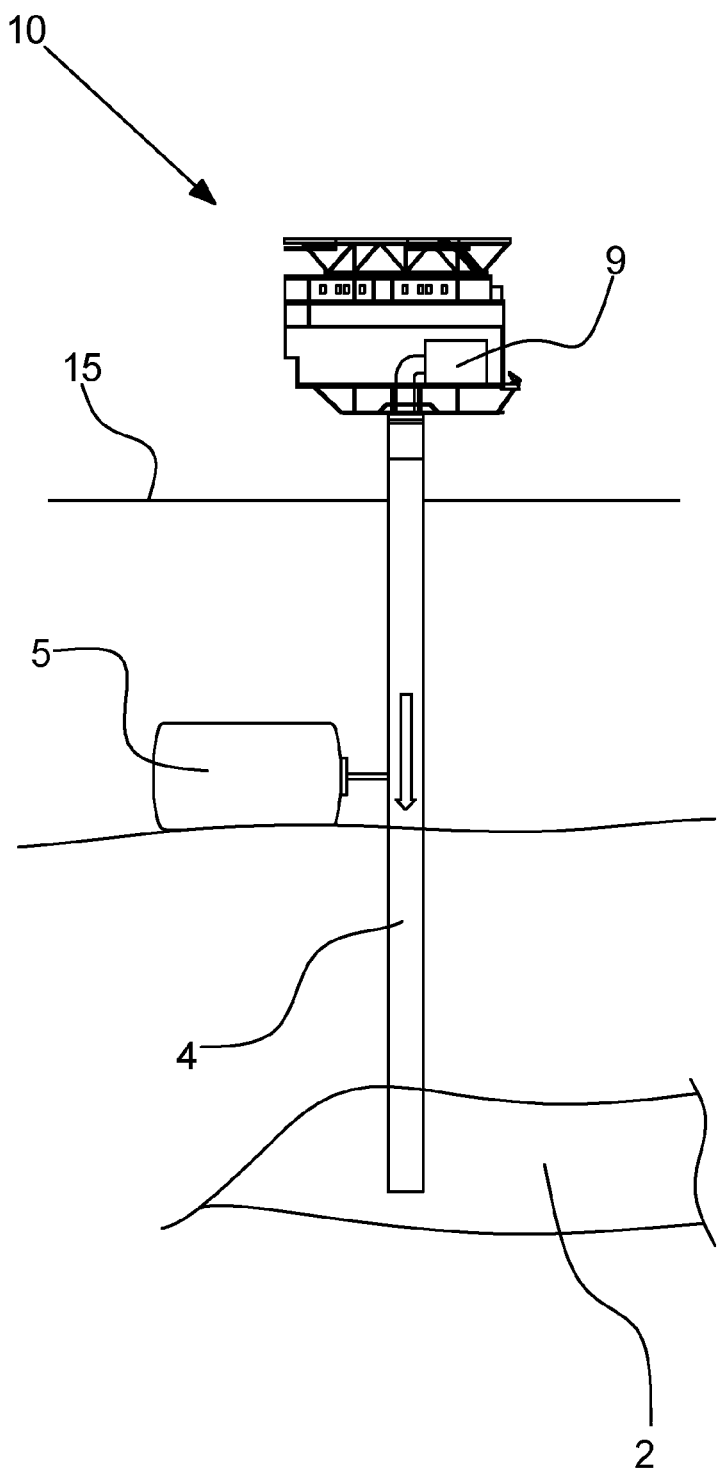
Figure 9:
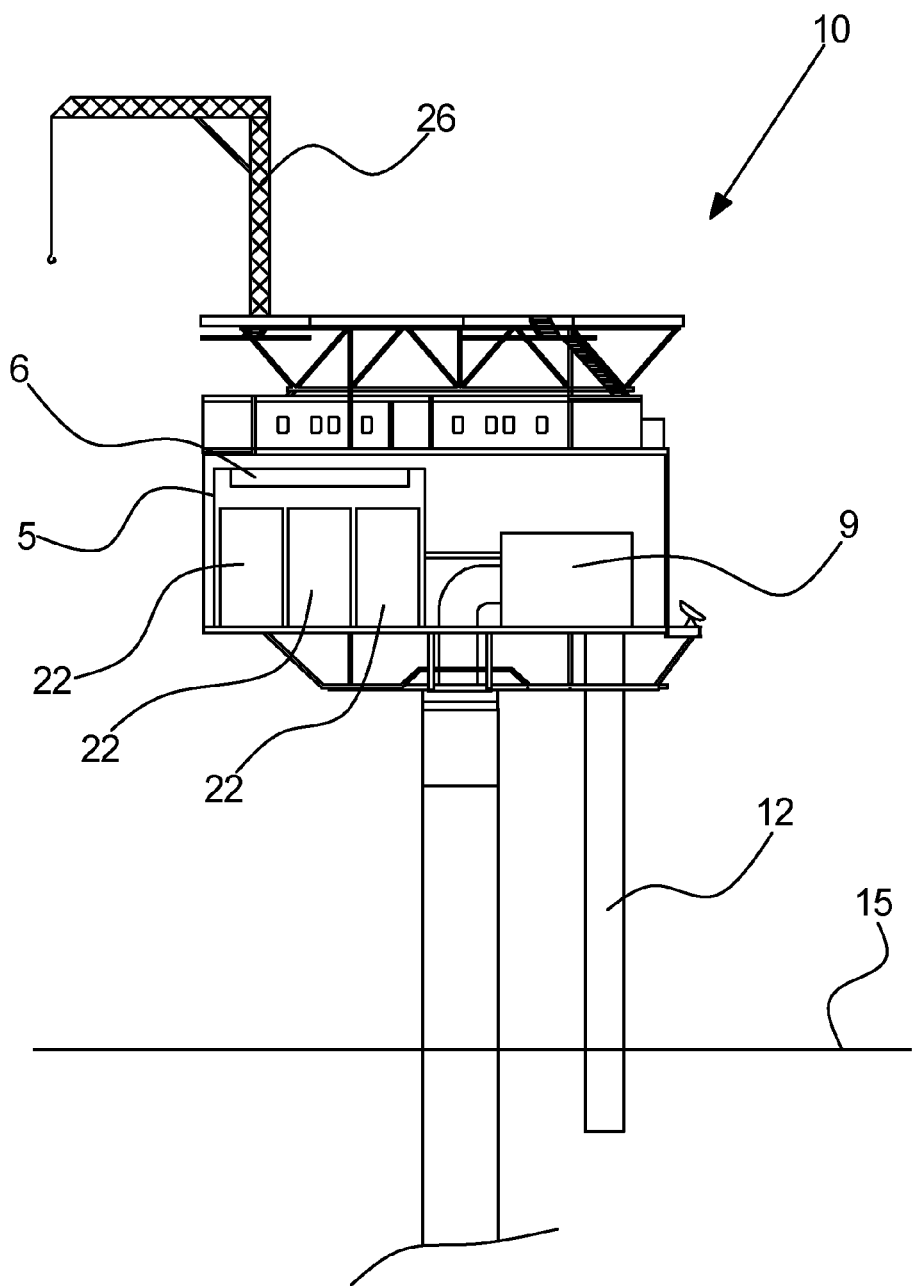
Figure 10A:
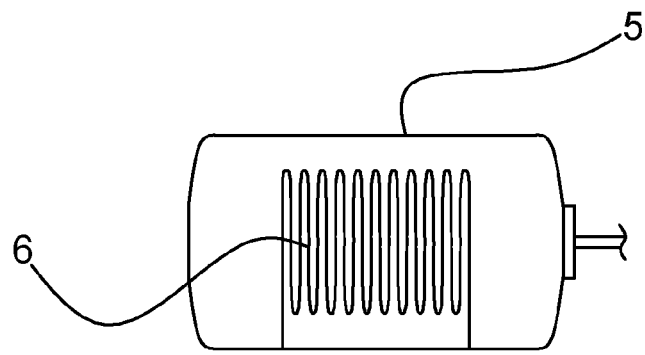
Figure 10B:
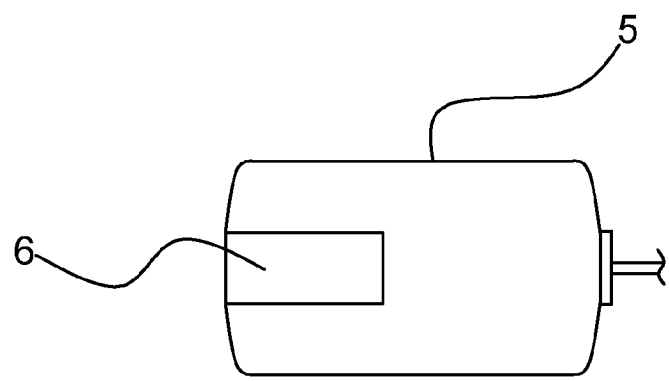
Figure 10C:
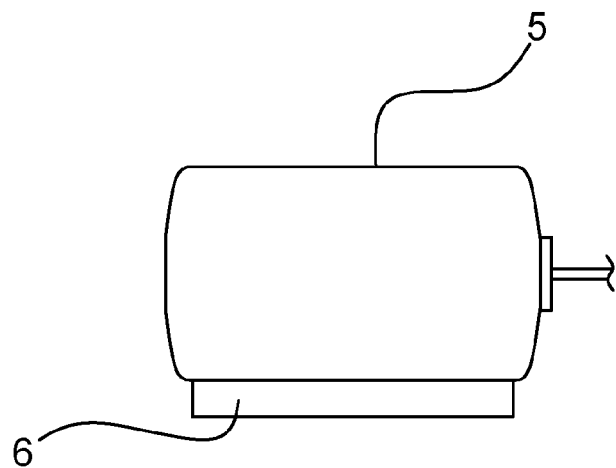
Figure 11:
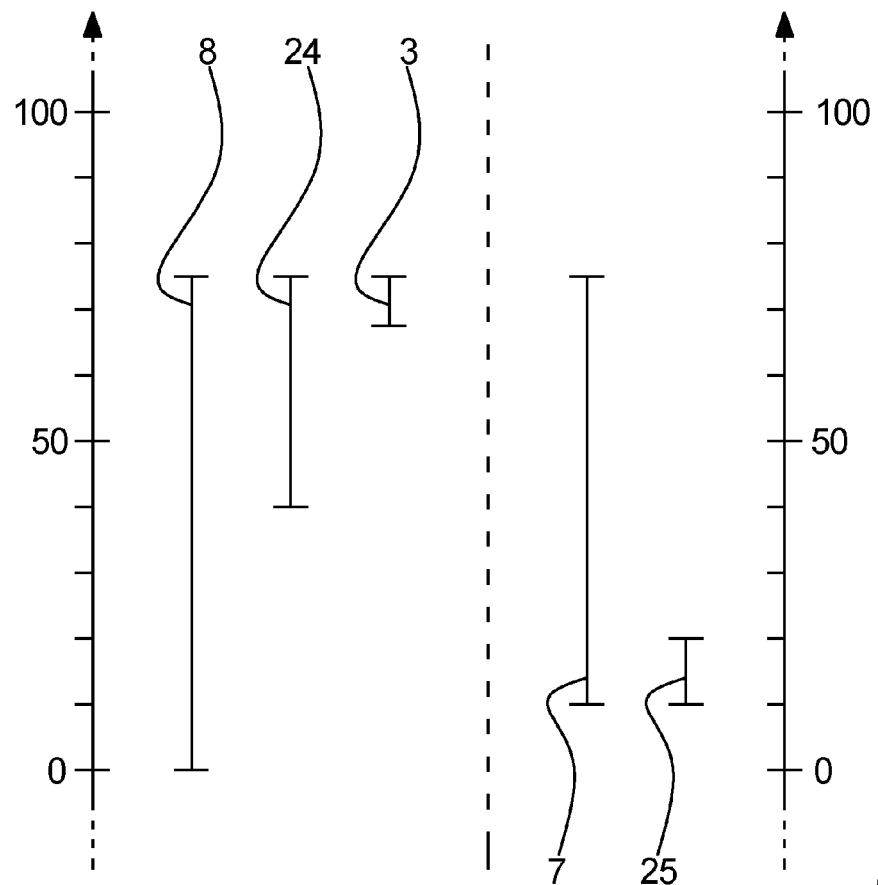
Figure 12:
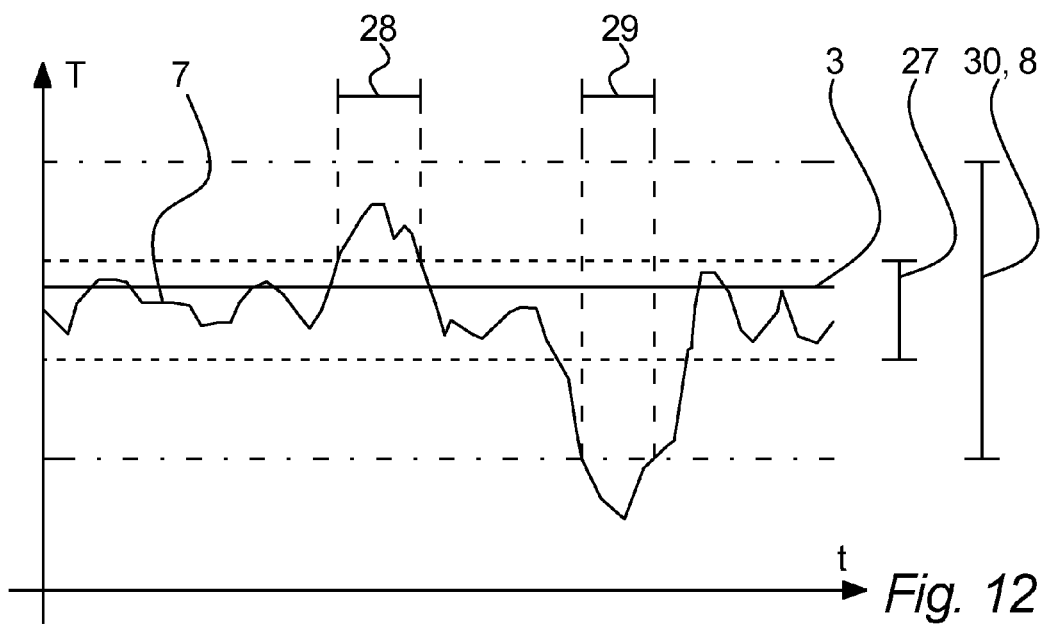

The invention will be described in the following with reference to the figures in which FIG. 1 illustrates an oil platform seen from the side, FIG. 2 illustrates injection and recovery of oil/liquid from an underground oil reservoir, FIG. 3 illustrates injection and recovery of oil/liquid from an underground oil reservoir in an off-shore application, FIG. 4 illustrates injection according to an embodiment of the invention, FIG. 5 illustrates injection of injection fluid and recovery of oil with temperature measuring means, FIG. 6 illustrates the use of a tanker as enzyme storage, FIG. 7 illustrates off-shore storage of enzymes in a semi-submerged tank, FIG. 8 illustrates an enzyme storage at the seabed, FIG. 9 illustrates an off-shore enzyme storage with mobile tanks, FIG. 10 illustrates different enzyme storage tanks, FIG. 11 illustrates different temperature ranges relevant to the invention, and FIG. 12 illustrates the temperature of enzymes in an enzyme storage.

DETAILED DESCRIPTION

Referring to FIG. 1, an off-shore oil platform for injection 10 is illustrated according to one embodiment of the invention. The off-shore oil platform 10 is equipped with injection means 9, operating to inject an injection fluid comprising enzymes and a liquid into an underground oil reservoir 2, which contains oil, through an injection well 4. In an example embodiment the enzymes are provided as a liquid pre-mix comprising enzymes and a liquid, and the liquid may be e.g. substantially water. The water may be provided to the injection means 9 by a water intake 12, which facilitates transport of water from below the sea surface into the injection means 9. In other example embodiments, the injection fluid comprises chemicals for aiding the enzymes or for increasing the release of oil in the underground. Such chemicals could e.g. be surfactants, acidic or alkaline substances, polymers, emulsions, or other chemicals used for oil recovery. These chemical may be dissolved or suspended in polar solvent, such as water or alcohols, or in non-polar solvent such as recovered oils or processed or synthetic solvents. The injection liquid may in other embodiments comprise injection of oil or liquids extracted from oil. Such liquids may be heated or cooled prior to injection, in order to influence the temperature of the reservoir or otherwise to increase the release of oil. The mixture of a liquid and enzymes is injected into a sub-sea underground oil reservoir 2 in order to increase the amount of oil recovered from production wells located in the same reservoir. The enzymes are stored in an enzyme storage 5, comprising temperature control means. The enzyme storage 5 stores the enzymes at a operative temperature range of the enzymes i.e. at a temperature that is non-harmful to the enzymes. The selection of the storage temperature could in one embodiment of the invention be determined by the temperature of the underground reservoir. In one embodiment of the invention, the enzymes are chosen such that they are resistant to the temperatures of the underground oil reservoir 2, and storing them at temperatures in an operative temperature range will therefore not lead to degradation. This operative temperature range corresponds to the temperatures where the relevant enzymes are unharmed, i.e. they are not deteriorated, degraded, denaturalized, deactivated or the like. In one embodiment of the invention this would include that the enzymes was stored at a temperature below 0° C.—thus if the enzymes was dissolved or suspended in water during storage the enzyme liquid would be in the form of ice or slush ice.

In another embodiment of the invention, the storage temperature is chosen in relation to an oil temperature. This oil temperature is the temperature of the oil in the underground oil reservoir 2 or the reservoir temperature, and it may be obtained various ways, e.g. by direct or indirect measuring or by estimation or modelling. In most cases direct measurement would be preferred in that it would provide the most accurate measurement.

An advantage of the invention is that it opens a possibility of injection of a broad spectrum of enzymes. Because oil recovery may well be performed under hostile conditions it limits the possibilities for the use of enzymes. If enzyme injection is performed in desert climates, such as the Middle East, surface temperatures above 50° C. are frequently experienced. If enzymes are stored in a tank placed in direct sunlight, the temperature will be even higher. On the other hand oil recovery in the North Sea or even Alaska or Siberia may be done when surface temperatures are significantly below 0° C. Such extreme climate conditions may limit the use of enzymes, and the limitations imposed by the extreme climate may well be comparable or even stricter than limitations imposed by the reservoir conditions (temperature in the reservoir). It is therefore an advantage of the invention that the enzyme is protected according to the claims such that the limitations imposed by the surface conditions are minimized.

Enzymes for enhanced oil recovery may be damaged or degraded from extreme temperatures, e.g. when the temperature exceeds 60° C., 65° C., 70° C., 75° C., 80° C., 85° C., 90° C., 95° C., 100° C., 105° C., 110° C., 115° C., 120° C., 125° C., or 130° C. or other levels depending on the type of enzyme and other factors, such as e.g. pressure or pH level etc. There may also be a lower limit to the temperature range in which the enzymes are stable. This limit could for enzyme dissolved or suspended in water be at 0° C., where water freezes and a damaging phase shift occurs. Such phase shifts may be especially destructive if the storage temperature fluctuates around the phase shift temperature, and the phase shift occurs multiple times. For the freezing point of water this is repeatedly freezing and thawing of the water. Yet another damaging factor for the enzymes may be rapid changes in the storage temperature. Such shock effect as rapid cooling or heating of the enzyme storage may e.g. be caused by changes in weather, or the degree of exposure to direct sunlight, changes in the adjacent temperature during the shift from day to night and from night to day. To avoid such rapid temperature changes, the enzymes storage 5 has temperature control means 6 working to keep the storage temperature relatively constant or at least within a desired range.

In one embodiment of the invention, enzymes for enhanced oil recovery are advantageously stored at temperatures substantially lower than the oil temperature. Such storage may prevent or minimize degradation of enzymes while stored. In an example embodiment the enzyme might reach a certain point of degradation—e.g. 50% degradation—after e.g. 80 days at 70° C., but at a temperature of 10° C., it might take several years to reach this point of degradation or inactivation. If the enzyme is stored at the location of injection for an average period of e.g. 40 days, if may be advantageous to store the enzyme at 10° C. In a simple estimate, storage at 70° C. will result in the enzyme reaching 50% degradation after 40 days of storage and 40 days in the well, while storage at 10° C. will result in the enzyme only reaching this point of degradation after 80 days in the well. Therefore, in this example and according to this simple estimate, storage at 10° C. will in some cases result in a doubled lifetime and therefore doubled effect of the enzymes in the well.

According to an example embodiment of the invention the injection pump system may comprise one or more turbine driven pumps. In other example embodiments, the injection pump system may comprise gas powered turbine pumps, booster pumps, positive displacement pumps, rotating pumps, rotary vane pumps, screw pumps, velocity pumps, centrifugal pumps, or other pumps types suitable for pumping relatively high volumes at relatively high pressure. The pressure of the injection fluid at the point where it meets the reservoir may e.g. be between 1700 and 2900 psi depending or the type of the reservoir. The pressure referred to here is the hydrostatic pressure.

The temperature of the enzyme storage temperature control may in one embodiment be chosen in relation to the oil temperature that has been obtained by measurements, estimation or by other means. In one example embodiment the oil temperature $T_{oil}$ has been obtained. The storage temperature may then be chosen to be in a temperature interval between $T_{oil}-\Delta T$ and $T_{oil}+\Delta T$, where $\Delta T$ is chosen as a percentage of the oil temperature $T_{oil}$. In one example $\Delta T$ may e.g. be $0.2 \cdot T_{oil}$, which yield a storage temperature interval that ranges from 20% below to 20% above the oil temperature $T_{oil}$. In other example embodiments, $\Delta T$ may be chosen as $0.3 \cdot T_{oil}$, $0.4 \cdot T_{oil}$, $0.5 \cdot T_{oil}$, $0.6 \cdot T_{oil}$, $0.7 \cdot T_{oil}$, $0.8 \cdot T_{oil}$, or $0.9 \cdot T_{oil}$. These are only example values and other values may be chosen within the scope of the invention.

In one embodiment of the invention, the enzyme storage temperature interval is chosen asymmetric in relation to the oil temperature. This could in an example embodiment mean that the lower limit of the storage temperature interval is chosen lower the oil temperature, e.g. as the 10° C. lower than the oil temperature, and that the upper limit of the storage temperature interval is chosen as the oil temperature or lower than oil temperature, by e.g. 5° C. These are just examples illustrating some ways of choosing the storage temperature interval in relation to the oil temperature.

In other embodiments, the storage temperature is not an interval, but just one value, which the temperature control means adjust to. Therefore, the terms storage temperature or storage temperature interval are used interchangeably.

In one embodiment of the invention, the enzymes to be used for enhanced oil recovery are chosen in relation to the oil temperature. This is done so that the enzymes that are chosen relatively stable at the temperatures of the reservoir, such that unnecessary degradation of the enzymes after injection is minimized. The storage temperature interval or the storage temperature of the enzyme storage may then be chosen in relation to the enzymes that have been chosen on the basis of the oil temperature. The storage temperature could in an example be chosen in relation to e.g. the optimal workable temperature of the enzymes or the temperature interval in which the enzymes are not degraded. According to this embodiment of the invention, the oil temperature determines the type of enzymes that are used, which again determines the enzyme storage temperature interval. I.e. the temperature of the underground oil reservoir indirectly determines the storage temperature interval. Again the storage temperature interval may be chosen symmetrically, asymmetrically, or displaced in relation to the operative temperature range for the enzymes.

The term enzyme degradation is generally to be understood in a broad sense. It may be a process that destroys the enzyme, inactivates it, denaturalizes it, or any effect on the enzyme causing it to have a lower activity in the underground oil reservoir after injection. This effect may e.g. come from extreme temperatures, rapid temperature changes, extreme pressure or pressure changed, chemical inactivation, from the presence of inhibitors or from a combination of more of these.

Referring to FIG. 2, an example of an enhanced oil recovery system 1 according to one embodiment of the invention is illustrated. The recovery system 1 comprises injection means 9 injecting enzymes and an injection liquid, enzyme storage 5, an injection well 4 from the surface into an underground oil reservoir 2, a production well 13 from the surface to the oil reservoir 2, recovery means 14 for the recovery of oil and/or liquids from the reservoir, a wellhead 16, and an oil pipeline 17. In this embodiment the recovery means 14 is illustrated as a pump placed in the top of the production well 13. In other embodiments, the recovery means may comprise other pumping means, such as one or more electrical submersible pumps (ESP), eductor-jet pumps, centrifugal pumps, or other production means, such as gas injection. These pumps may in various embodiments of the invention be located in the production well 13 or on top of the injection well. In yet other embodiments recovery means may not be needed as such, if the pressure in the oil reservoir 2 is sufficiently high to facilitate recovery of oil from the oil reservoir 2. For these embodiments the recovery means pump the oil from the oil reservoir 2 to the surface by pulling the oil from the top of the production well 13 or pushing the oil upwards from within the production well 13. This is especially the case in relation to onshore operations. However, in relation to offshore operation the oil is generally lifted by means of gas lift or ESP. Transfer of oil in the surface system is controlled by the wellhead flowing pressure—this pressure is maintained to allow little involvement of active pump systems.

The recovery system 1 works by injecting large amounts of injection fluids comprising liquid and enzymes into the underground oil reservoir 2. The injected fluid increases the pressure around the injection well 4. This locally increased pressure and the resulting pressure gradient causes the injection fluid to move oil and/or liquids away from the injection well 4. The enzymes in the injection fluid will exert their effect on the reservoir. This effect may e.g. be physical, chemical, or bio-chemical. In example embodiments such effects may be one or more from surface tension change, viscosity change, carbon-carbon bond scissoring, emulsifying, and other effects releasing oil from the reservoir or increasing the production of oil. Oil and/or liquids are recovered from the oil reservoir 2 through the production well 13, leading to a local decrease in pressure in the oil reservoir 2 near the production well 13. Correspondingly, this leads to a pressure gradient causing the oil and/liquids in the oil reservoir 2 to flow towards the production well 13. By placing the injection well 4 and production well 13 correctly, a satisfying flow from the injection well 4 to the production well 13 can be secured. The injection fluid is injected by injection means 9, and comprises enzymes supplied from the enzyme storage 5 and a liquid such as water. The enzyme storage 5 is in this embodiment maintained under a temperature that is set relative to temperature range of stability of the enzymes.

In other embodiments of the invention, there may be several injection wells 4 or production wells 13 in the same underground oil reservoir 2. In such embodiments, the flow in the underground will depend on all wells. However, the pressure gradient will also in such embodiments cause the injection fluid and/or oil or other liquids in the underground oil reservoir 2 to flow from the injection wells 4 to the production wells 13. This applies to both on-shore and off-shore applications and embodiments.

In yet another embodiment of the invention, the injection well 4 and the production well 13 may be the same well. This could e.g. mean that injection and production are performed sequentially in order to inject enzymes and recover oil. Such an embodiment may be used for both on-shore an off-shore applications.

Referring to FIG. 3, an enhanced oil recovery system 1 according to one embodiment of the invention is illustrated. The recovery system 1 comprises an off-shore oil platform for injection 10 located at the injection well 4 and an off-shore oil platform for recovery 11 located at the production well 13. The oil platform 10 for injection comprises an enzyme storage 5 and injection means 9, the injection means 9 injecting injection fluid comprising enzyme from the enzyme storage 5. The oil platform for recovery 11 comprises recovery means 14. The recovery means may in an example embodiment comprise one or more pumps located in the production well 13, such pumps could e.g. be Electrical Submersible Pumps (ESP), turbine pumps, booster pumps, positive displacement pumps, rotating pumps, rotary vane pumps, screw pumps, velocity pumps, centrifugal pumps, or other pumps suitable for the extreme pressures or conditions of the production well 13. The injection fluid is injected into the underground oil reservoir 2 through the injection well 4, and moved due to a pressure gradient through the reservoir towards the production well 13, from where oil and/or fluids from the oil reservoir 2 is recovered. In different embodiments, the recovered fluids and/or oil may be processed on site at the oil platform for recovery 11, or it may be loaded onto tank ships and processed elsewhere, or it may be sent through pipelines to off-shore processing platforms or to on-shore processing plants.

In other embodiments of the invention, one off-shore oil platform may operate several wells. This could be one oil platform for injection 10 operating several injection wells 4, or as one oil platform for production 11 operating several production wells 13. And in other embodiments, one oil platform may operate both injection wells 4 and production wells 13.

Referring to FIG. 4, an embodiment of the invention is illustrated. A close up of the top of injection well 4 and the enzyme storage 5 can be seen. Temperature control means 6 is in this embodiment illustrated as heating means, but may in other embodiments be cooling means or a combination of heating and cooling means. These temperature control means 6 may in various embodiments be integrated in the enzyme storage 5 or forming a part of this. In other embodiments, the temperature control means may be placed externally to the enzyme storage and exert its effect on the enzymes storage by e.g. being in close proximity of this, or by means of transfer of e.g. liquids or gasses. The injection means 9 injecting liquid and enzymes into injection well 4 is in this embodiment of the invention assisted by water pre-pump 20 pumping water from e.g. a water pipeline or a water reservoir to injection means 9. Injection means 9 is also assisted by enzyme pre-pump 21 pumping enzymes from the enzymes storage to injection means 9. In alternative embodiments only the water or the enzyme pre-pump is used or the output of the enzyme pre-pump may be plugged directly into the injection well 4.

Referring to FIG. 5, a close-up of the injection of injection fluid according to one embodiment of the invention is illustrated. The injection is facilitated by injection means 9, which injects injection fluid comprising enzyme from enzyme storage 5 and water into an underground oil reservoir 2 through the injection well 4. In this embodiment of the invention, the oil temperature is measured by a temperature measuring means 19 located down-hole, i.e. in the oil reservoir 2. The measurement data of the temperature measuring means 19 is transmitted through communication link 23 located in the injection well 4. In alternative embodiments, the measurement data may be values of the temperature or values other parameters from which information about the temperature can be extracted. In an example embodiment of the invention, the temperature measuring means may be a temperature gauge or may be part of a down-hole gauge measuring temperature as well as values of parameters other than temperature in other to obtain information about these parameters. These parameters may be e.g. pressure or various flow conditions of the underground oil reservoir. The temperature measuring means may be located in the injection well 4, in the production well, or in other types of wells or drillings. Such temperature measuring means may be combined with other embodiments of the invention, and may in particular be utilized in off-shore operations.

In one embodiment of the invention, the temperature measuring means may be placed at the production well above the surface of the ground to give information about the oil temperature of the recovered oil. In some embodiments this information may be temperature data obtained directly by measurements or other data giving indirect information about temperature. Examples of such other data may comprise e.g. chemical composition of the oil, viscosity, or other types of relevant information about the recovered oil.

In an example embodiment, the temperature may be estimated using measured or estimated data, or data from model calculations such as thermodynamically modelling. Such data may comprise pressure, flow, depths, data obtained during drilling of the well, data obtained from recovered oil or liquids, geological data, geographical data, seismic data or analysis, composition of hydrocarbons recovered from the reservoir, and characteristics, such as size or type, of reservoir. Such data may be used to model or simulate the behaviour and temperature of the underground oil reservoir. Again such models or simulations may estimate the temperature distribution over parts of or the whole of the underground oil reservoir, where one of the inputs may be temperature measured by one or more temperature gauges. Using such models or simulations, the average temperature of the reservoir may be calculated or estimated. The concept of average temperature is to be understood in a broad sense as a measure of the temperature in the reservoir which may be obtained different ways. It could e.g. refer to the spatial average of the temperature, since temporal variations are slow or neglected. It may also be a weighted average or effective average, e.g. with the oil density or the expected recovery fraction in a given point as the weighting factor, or other relevant parameter. The average temperature may then be a result of e.g. a theoretical model, a model based on measurements, a model based on temperature measurements, directly from one or more temperature measurements, as a combination of more of these examples, or other ways of obtaining the reservoir temperature.

Referring to FIG. 6, an off-shore oil platform for injection 10 is shown comprising injection means 9. The injection means 9 inject an injection fluid comprising enzymes supplied by a tank ship 18. The tank ship 18 comprises an enzyme storage 5 with temperature control means 6. Supplying enzymes directly from an enzyme storage 5 located in or on a tank ship 18 may in some embodiments have advantages over supplying enzymes from an on-platform enzyme storage. Such advantages may be that larger capacities are possible, and that no time is wasted loading/unloading the tank ship 18 supplying the enzymes to the oil platform 10. In an alternative embodiment, the enzyme may be stored in mobile tanks on a ship, where the tanks can be moved to the oil platform by means of e.g. a crane. Yet in another alternative embodiment the enzymes may be moved from the tank ship 18 to an enzyme storage 5 located on the oil platform 10 via pipelines by means of pumping.

Referring to FIG. 7, an off-shore oil platform 10 according to an embodiment of the invention is illustrated. The oil platform 11 comprises injection means 9, injecting injection fluid comprising enzyme from an enzyme storage 5 and water. According to this embodiment, the enzyme storage 5 consists of a floating tank, which is partly submerged in water. The tank may in some embodiments comprise floating elements to keep it floating and may be locked to the platform or sea bottom to keep the position fixed. According to this embodiment of the invention, the temperature control is performed at least partly by letting the tank be cooled or heated by the water in which it is partly submerged in. In another embodiment the enzyme storage may be a part of the oil platform, but still be partially or fully submerged to facilitate at least partly cooling of enzymes. In other embodiments of the invention, the enzyme storage may be cooled by partial of full submersion in a cooling liquid such as water. This liquid may be e.g. the sea, even in on-shore applications, or it may be other natural or artificial water reservoirs, lakes, or pools. The liquid may also comprise cooling liquids other than water. Such embodiments may also be combined with embodiments where the enzymes are contained in mobile tanks or containers.

According to another embodiment of the invention, the tank may be fully submerged in water. According to this embodiment of the invention, the temperature control is performed at least partly by letting the tank be cooled or heated by the water in which it is fully submerged in.

In some embodiments of the invention, the enzyme is stored in a plurality of tanks or containers, i.e. the enzyme storage comprises several tanks or containers for storage of enzyme. Such embodiments may be combined with embodiments for on-shore as well as embodiments for off-shore application.

Referring to FIG. 8, an off-shore oil platform for injection 10 and an enzyme storage 5 according to one embodiment of the invention is illustrated. The oil platform 10 comprises injection means 9. The injection means 9 inject injection fluid into the underground oil reservoir 2 through injection well 4. The injection fluid may be substantially water to which enzymes are added at the seabed level from enzyme storage 5. By having an enzyme storage 5 at the seabed level, the temperature of the surrounding are more constant compared to having an enzyme storage at the platform. Hereby unwanted fluctuations in the temperature of the enzymes are minimized. The temperature control of the enzymes storage 5 may in an embodiment of the invention be at least partly facilitated by the temperature of the surrounding sea water. In another embodiment of the invention, the enzymes may be transported to the oil platform 10 from the enzyme storage 5, and be added to the injection fluid in the oil platform 10.

Referring to FIG. 9, an off-shore oil platform for injection 10 is illustrated according to one embodiment of the invention. The off-shore oil platform 10 is equipped with injection means 9, operating to inject an injection fluid comprising enzymes and a fluid, such as water. Water can be supplied to injection means 9 by water intake 12. Enzymes are supplied from enzymes storage 5, which in this embodiment comprises temperature control means 6 and a plurality of mobile enzyme tanks 22. Various embodiments may include one or more mobile enzyme tanks. The mobile enzyme tanks 22 may be provided to the oil platform 10 by e.g. ship and a crane 26 placed on the oil platform 10, or by means of a helicopter. An advantage of this embodiment is that the temperature control means 6 are separated from the enzymes tanks 22, which allows these tanks to be easily replaced for e.g. filling or repair.

Referring to FIGS. 10a, 10b, and 10c, different enzyme storages 5 are shown according to different example embodiments of the invention. The enzyme storages all comprise a tank and an element for heating or cooling of the tank, i.e. temperature control means 6. The heating element, as shown in FIG. 10a, may e.g. be a resistive element, which is connected to a voltage supply, transforming electrical effect into heat and transferring it to the container content. Different shapes and types of such a heating element may be imagined in order to give a satisfying heat transfer to the content of the tank. In other example embodiments, the enzyme storage 5 may be heated by heating sources available on the oil platform 10. Such heating sources may e.g. be burning of gas or hydrocarbons recovered from the reservoir, heat of recovered liquids or oil, heating by means of solar energy, heating means for cabins housing the platform crew, or from any other heating means already available on the platform. Such heat may be transferred to the enzyme storage by e.g. a heat exchanger or by placing the enzyme storage in the vicinity of such a heating source. Cooling elements as shown in FIG. 10b may also be used to control the temperature of enzymes in a warm climate. Such cooling may be facilitated by active cooling by cooling liquids or cooling gasses, or by passive cooling by placing the enzyme storage 5 in a cold medium, such as water. The heating or cooling element may in the example embodiment illustrated on FIG. 10c be arranged external to the tank or integrated in the tank, so that the heating or cooling of the enzymes are indirectly, in that it heats or cools the storage tank which then heats or cools the enzymes. The enzyme storage 5 may in another example embodiment be one or more tanks or containers designed to store enzyme in solid form, e.g. as a powder or powder-like material, where the enzymes are mixed with a liquid such as water to give a liquid enzyme pre-mix which can be added to the injection stream, or where the enzymes are added directly into the injection stream. In yet another example embodiment, the enzyme storage 5 may be a shipping container, such as an intermodal container or a tank container. In some embodiments, such a container may comprise heating of cooling means. In other embodiment the container may be cooled or heated by external cooling or heating, such as a heated or cooled room. In some embodiments these containers may be designed as a tank for liquids comprising enzymes, whereas in other embodiments the container work as storage for smaller mobile tanks or containers for storage of enzyme. In a further example embodiment an enzyme storage 5 comprises by a heated or cooled floor on which one or more tanks or containers are placed. In another example embodiment, the enzymes storage 5 comprises one or more tanks or containers over which a liquid or gas facilitating heating or cooling is poured, sprayed, or otherwise distributed over. In some embodiments, the enzyme storage 5 may comprise one or more tanks or containers with a suitable insulation. Such insulation may in some embodiments be needed to overcome the temperature differences between the desired temperature and the ambient temperature. In general, temperature control means may be assisted by means for stirring or means for facilitating mixing of the enzyme storage content. Such means may assist the temperature control means in keeping the enzymes at a uniform temperature throughout the enzyme storage.

Referring to FIG. 11, an example of relevant temperatures is illustrated according to an example embodiment of the invention. In this example embodiment the enzymes are stable in an operative temperature range 8 from 0° C. to 75° C., whereas it is only active in the workable temperature range 24 from 40° C. and 75° C. The oil temperature 3 could in this example embodiment be measured or estimated to be e.g. between 65° C. to 75° C. The enzymes are stored in the enzyme storage, so that the temperature of enzymes 7 is kept at a temperature be between e.g. 10° C. and 75° C. using temperature control means. According to another example embodiment of the invention, it may be an advantage to store the enzymes at an example storage temperature 25, which is lower than the temperature of the underground oil reservoir, but still within the operative temperature range 8. This could as illustrated be between e.g. 10° C. and 20° C.

Referring to FIG. 12, an example of time-dependent temperature of enzymes is illustrated according to an example embodiment of the invention. The temperature of enzymes 7 is illustrated as a temperature T as a function of time t. In this embodiment of the invention the critical temperature range 30 is an operative temperature range 8 of the enzymes in the enzymes storage 5 i.e. the critical temperature range 30 is in this embodiment identical with the temperature range in which the enzymes are undamaged.

However, in another embodiment of the invention the critical temperature range 30 could be defined in relation to the oil temperature 3 e.g. to store the enzymes at a temperature which is particularly suited for recovering oil at the particular oil temperature, or the critical temperature range 30 could be defined in accordance with both the operative temperature range 8 of the enzymes and the oil temperature 3

In this embodiment the enzymes in the enzyme storage 5 are chosen in relation to the oil temperature 3 and the oil temperature 3 is therefore also within the critical temperature range i.e. operative temperature range 8 in this embodiment.

In this example embodiment, the desired temperature range 27 for storage of enzymes is chosen such that the oil temperature 3 is within the desired temperature range 27. In other example embodiments, the oil temperature could be outside the desired temperature range 27. In this example embodiment, the enzymes storage 5 is controlling the temperature of enzymes to be within this desired temperature range 27. As it is illustrated the temperature fluctuates within the limits of the desired temperature range 27. However, two different kinds of events occur, in which the temperature deviates from the desired temperature range. In an undesired event 28, the temperature of enzymes 7 is illustrated to exceed the upper limit of the desired temperature range 27, but is still within the operative temperature range. An undesired event 28 could, however, also have been an event in which the temperature of enzymes exceeded the lower limit of the desired temperature range 27, but where it was still within the limits of the operative temperature range 8. The undesired event is undesired in the sense that the temperature of enzymes 7 exceeds the desired limits set by the temperature storage 5 and the temperature control means 6. Therefore, the temperature of enzymes 7 is closer to the boundaries of the critical temperature range 30, and therefore closer to a damaging temperature. However, as the temperature of enzymes 7 is still within the critical temperature range 30, the enzymes are not damaged, and the event 28 is therefore not damaging to the enzymes as such. As it is illustrated in FIG. 12, the undesired event 28 could occur because of e.g. a particular warm day, or a malfunction in the temperature control means. Another kind of event is illustrated in FIG. 12. A critical event 29 occurs when the temperature of enzymes 7 drops below the lower limit of the operative temperature range 8. A critical event 29 may also be an event where the temperature of enzymes 7 exceeds the upper limit of the critical temperature range 30. The critical event 29 is critical in the sense that the enzymes in this embodiment will be damaged depending on the duration of the critical event 29. If the critical temperature range 30 was defined in relation to the oil temperature 3 the critical event 29 could be critical in the sense that the enzymes were too cold or too hot to be effective at recovering oil when injected into the underground oil reservoir 2.

In this embodiment the enzyme storage 5 may need to be refilled to compensate for the damaged enzymes. In some embodiments, the duration and/or the degree of exceeding the operative temperature range 8 may be used to estimate whether the enzymes storage 5 should be refilled, more enzymes should be added, or how much enzyme should be added. The temperature control means 6 should according to an embodiment of the invention operate to avoid or at least minimize the occurrence of undesired events 28 and in particular critical events 29.

In other embodiments of the invention, the temperature control may be performed according to a simpler scheme than having a desired temperature range 28. This could be by having only a desired temperature. In yet other embodiments, the temperature control may be more complicated and involve multiple temperature ranges graduating the temperature control response.

The invention has been exemplified above with reference to specific examples of enhanced oil recovery systems 1 and methods and specific examples of enzymes storages 5, temperature control means 6 and other. However, it should be understood that the invention is not limited to the particular examples described above but may be designed and altered in a multitude of varieties within the scope of the invention as specified in the claims.

LIST

1. Enhanced oil recovery system
2. Underground oil reservoir
3. Oil temperature
4. Injection well
5. Enzyme storage
6. Temperature control means
7. Temperature of enzymes
8. Operative temperature range
9. Injection means
10. Off-shore oil platform for injection
11. Off-shore oil platform for recovery
12. Water intake
13. Production well
14. Recovery means
15. Sea surface
16. Wellhead
17. Oil pipeline
18. Tank ship
19. Temperature measuring means
20. Water pre-pump
21. Enzyme pre-pump
22. Mobile enzyme tank
23. Communication link
24. Workable temperature range
25. Example storage temperature
26. Crane
27. Desired temperature range
28. Undesired event
29. Critical event
30. Critical temperature range

The invention claimed is:

1. An enhanced oil recovery system, comprising
an underground oil reservoir comprising oil having an oil temperature,
an injection well in fluid communication with said underground oil reservoir,
an enzyme storage comprising a temperature controller, wherein said temperature controller is adapted for controlling the temperature of enzymes in said enzyme storage in relation to an operative temperature range of said enzymes, and
an injector for creating an injection stream comprising enzymes from said enzyme storage to said underground oil reservoir through said injection well.

2. The enhanced oil recovery system according to claim 1, wherein said enzyme storage is arranged in close proximity of said injection well.

3. The enhanced oil recovery system according to claim 1, wherein said temperature controller comprises an active cooler.

4. The enhanced oil recovery system according to claim 1, wherein said temperature controller comprises an active heater.

5. The enhanced oil recovery system according to claim 1, wherein said temperature controller is integrated in or forming part of said enzyme storage.

6. The enhanced oil recovery system according to claim 1, wherein said temperature controller is arranged external to said enzyme storage.

7. The enhanced oil recovery system according to claim 1, wherein said enzyme storage comprises a plurality of mobile tanks.

8. The enhanced oil recovery system according to claim 1, wherein said enhanced oil recovery system comprises one or more temperature measuring arrangement for obtaining said oil temperature.

9. The enhanced oil recovery system according to claim 8, wherein at least one of said one or more temperature measuring arrangement is arranged at a production well above the surface of the ground.

10. The enhanced oil recovery system according to claim 8, wherein at least one of said one or more temperature measuring arrangement is arranged in or at said underground oil reservoir.

11. The enhanced oil recovery system according to claim 1, wherein said enhanced oil recovery system comprises an oil temperature modelling unit capable of obtaining said oil temperature in said underground oil reservoir based on geological and/or geographical input.

12. The enhanced oil recovery system according to claim 1, wherein said enzymes are selected from the group comprising oil viscosity lowering enzymes, oil surface tension reducing enzymes, carbon-carbon bond scissoring enzymes, oil-wet altering enzymes, and any combination thereof.

13. The enhanced oil recovery system according to claim 1, wherein said temperature controller is adapted for maintaining the temperature of said enzymes in said enzyme storage within a desired temperature range.

14. The enhanced oil recovery system according to claim 13, wherein said desired temperature range is within 40% of said operative temperature range of said enzymes from each of the upper and the lower limit of said operative temperature range.

15. The enhanced oil recovery system according to claim 1, wherein said temperature controller is adapted for maintaining the temperature of said enzymes below 120° C.

16. The enhanced oil recovery system according to claim 1, wherein said temperature controller is adapted for maintaining the temperature of said enzymes above −30° C.

17. The enhanced oil recovery system according to claim 1, wherein said enzymes are dissolved or suspended in a liquid in said enzyme storage.

18. The enhanced oil recovery system according to claim 17, wherein said liquid is water.

19. The enhanced oil recovery system according to claim 1, wherein said temperature controller is adapted for controlling the temperature of said enzymes in said enzyme storage in relation to said oil temperature.

20. The enhanced oil recovery system according to claim 19, wherein said temperature controller is adapted for maintaining the temperature of said enzymes in said enzyme storage within a desired temperature range.

21. The enhanced oil recovery system according to claim 20, wherein said desired temperature range is 80% above to 80% below said oil temperature.

22. A method for operating an underground oil reservoir, said method comprising the steps of:
- providing said underground oil reservoir with an injection well,
- obtaining an oil temperature of oil in said underground oil reservoir,
- controlling the temperature of enzymes in an enzyme storage in relation to an operative temperature range of said enzymes and said oil temperature, and
- establishing an injection stream into said underground oil reservoir through said injection well, wherein said injection stream comprises enzymes from said enzyme storage.

* * * * *